US012693304B2

(12) United States Patent
     Kindel et al.

(10) Patent No.: US 12,693,304 B2
(45) Date of Patent: Jul. 28, 2026

(54) WHEEL SENSOR MOUNT

(71) Applicant: Doosan Bobcat North America Inc.,
               West Fargo, ND (US)

(72) Inventors: Michael Kindel, Bismarck, ND (US);
               David Glasser, Bismarck, ND (US)

(73) Assignee: Doosan Bobcat North America, Inc.,
               West Fargo, ND (US)

( * ) Notice: Subject to any disclaimer, the term of this
             patent is extended or adjusted under 35
             U.S.C. 154(b) by 319 days.

(21) Appl. No.: 18/602,652

(22) Filed: Mar. 12, 2024

(65) Prior Publication Data

US 2024/0329075 A1      Oct. 3, 2024

Related U.S. Application Data

(60) Provisional application No. 63/454,905, filed on Mar.
     27, 2023.

(51) Int. Cl.
     *G01P 3/44*       (2006.01)
     *F16C 33/58*      (2006.01)
     *F16C 41/00*      (2006.01)
     *G01P 1/02*       (2006.01)
     *G01P 3/481*      (2006.01)
     *G01P 13/04*      (2006.01)
(52) U.S. Cl.
     CPC ........... *G01P 3/443* (2013.01); *F16C 33/586*
          (2013.01); *F16C 41/007* (2013.01); *G01P*
          *1/026* (2013.01); *G01P 3/481* (2013.01); *G01P*
                                               *13/04* (2013.01)
(58) Field of Classification Search
     CPC .......... G01P 3/443; G01P 1/026; G01P 3/481;
                   G01P 13/04; F16C 33/586; F16C 41/007
     See application file for complete search history.

(56) References Cited

U.S. PATENT DOCUMENTS

| | | |
|---|---|---|
| 3,936,684 A | 2/1976 | Anselmino et al. |
| 4,037,690 A | 7/1977 | Fisher et al. |

(Continued)

FOREIGN PATENT DOCUMENTS

| | | | | |
|---|---|---|---|---|
| DE | 102004048654 A1 * | 4/2006 | ........ | B60B 27/0094 |
| DE | 102006033931 A1 | 1/2008 | | |

(Continued)

OTHER PUBLICATIONS

DE-102004048654-A1, English Translation (Year: 2006).*

*Primary Examiner* — Ryan D Walsh
(74) *Attorney, Agent, or Firm* — Westman Champlin &
Koehler, P.A.

(57)           ABSTRACT

Disclosed are mountable sensor apparatus configured to
measure a rotational speed of an axle of a power machine,
as well as power machines including the sensor apparatus.
The apparatus includes an encoder bearing sensor compris-
ing an inner race configured to be secured to the axle of the
power machine, an outer race, and bearings positioned
between the inner race and the outer race and configured to
allow rotation of the inner race relative to the outer race. A
bearing carrier of the apparatus is connected to the outer race
of the encoder bearing sensor, and a bracket is connected to
the bearing carrier and mountable to a support structure of
the power machine to prevent the bearing carrier and the
outer race from rotating with the inner race and the axle. A
sensor output line provides output signals indicative of
rotational speed and direction of the axle.

15 Claims, 4 Drawing Sheets

(56) References Cited

U.S. PATENT DOCUMENTS

| 4,795,278 | A | 1/1989 | Hayashi |
|---|---|---|---|
| 5,067,350 | A | 11/1991 | Grillo et al. |
| 5,103,170 | A | 4/1992 | Grillo et al. |
| 5,234,269 | A | 8/1993 | Grillo et al. |
| 5,567,058 | A | 10/1996 | Morita et al. |
| 6,203,204 | B1 | 3/2001 | Carmichael |
| 6,564,635 | B2 | 5/2003 | Sherman et al. |
| 7,959,358 | B2 | 6/2011 | Nakamura et al. |
| 9,752,617 | B2 | 9/2017 | Takada et al. |
| 10,295,557 | B2 | 5/2019 | Winkler et al. |
| 10,717,323 | B2 | 7/2020 | Yang |
| 2012/0126648 | A1* | 5/2012 | Georgi ................. F16C 41/007<br>73/862.642 |

FOREIGN PATENT DOCUMENTS

| WO | 2011077179 | A1 | 6/2011 |
|---|---|---|---|
| WO | 2014180474 | A1 | 11/2014 |

* cited by examiner

WHEEL SENSOR MOUNT

CROSS-REFERENCE TO RELATED APPLICATION(S)

This application claims the benefit of U.S. provisional application No. 63/454,905, filed on Mar. 27, 2023, the content of which is hereby incorporated by reference it its entirety.

BACKGROUND

The present disclosure relates to a mowers and other power machines which require precise and reliable sensing of wheel position and speed. More specifically, the present disclosure relates to a sensor and mount which allow the sensor to be mounted on the output shaft of an axle to sense wheel speed.

In many applications of power machines it is increasingly important to have the ability to accurately sense wheel speed of the power machine. For example, with autonomously operated power machines, precise and reliable measurement of wheel speed can be beneficial in control of operation of the machine. For power machines having transaxles without having sensor technology built into the transaxle, accurately and reliably sensing wheel speed can be difficult. Further, the need to accurately sense wheel speed is present in power machines that do not necessarily utilize transaxles. For example, in electrically powered power machines, while a conventional transaxle may not be present, accurate sensing of wheel speed can still be very beneficial in controlling the power machine.

The discussion above is merely provided for general background information and is not intended to be used as an aid in determining the scope of the claimed subject matter.

SUMMARY

Disclosed embodiments include mountable sensor apparatus configured to measure a rotational speed of an axle of a power machine, as well as power machines including the sensor apparatus. The apparatus includes an encoder bearing sensor comprising an inner race configured to be secured to the axle of the power machine, an outer race, and bearings positioned between the inner race and the outer race and configured to allow rotation of the inner race relative to the outer race. A bearing carrier of the apparatus is connected to the outer race of the encoder bearing sensor, and a bracket is connected to the bearing carrier and mountable to a support structure of the power machine to prevent the bearing carrier and the outer race from rotating with the inner race and the axle. A sensor output line provides output signals indicative of rotational speed and direction of the axle.

In an exemplary embodiment, a mountable sensor apparatus is provided, with the mountable sensor apparatus configured to measure a rotational speed of an axle of a power machine. The mountable sensor apparatus includes an encoder bearing sensor comprising an inner race configured to be secured to the axle of the power machine, an outer race, and bearings positioned between the inner race and the outer race and configured to allow rotation of the inner race relative to the outer race. The mountable sensor apparatus also includes a bearing carrier connected to the outer race. A bracket of the mountable sensor apparatus is connected to the bearing carrier and mountable to a support structure, with the bracket connection to the bearing carrier configured to prevent the bearing carrier and the outer race from rotating with the inner race and the axle when the inner race is secured to the axle and the bracket is mounted to the support structure. A sensor output line of the mountable sensor apparatus is configured to be coupled to a control system of the power machine to provide output signals indicative of rotational speed and direction of the axle.

In some embodiments, the mountable sensor apparatus further comprises a sleeve configured to be secured to the axle of the power machine to secure the inner race to the axle. The sleeve is in some embodiments configured to be secured to the axle using a set screw. In other embodiments, the inner race is press fit onto the sleeve.

In some embodiments, the bearing carrier is connected to the outer race using a set screw extending through the bearing carrier to prevent the outer race from rotating relative to the bearing carrier. In other embodiments, the bearing carrier is connected to the outer race by a press-fit connection between the outer race and the bearing carrier to prevent the outer race from rotating relative to the bearing carrier.

In some embodiments, the bracket is connected to the bearing carrier using fasteners extending through the bearing carrier and the bracket. In some embodiments, the support structure that the bracket is configured to be mounted to is a frame of the power machine.

In another exemplary embodiment, a power machine is provided which includes a frame; a power source supported by the frame and providing a rotational output for driving a tractive element of the power machine; a control system configured to control the power source; a sensor apparatus mounted to the frame and secured to the rotational output, the sensor apparatus configured to measure a rotational speed of the rotational output. The sensor apparatus includes an encoder bearing sensor comprising an inner race secured to the rotational output of the power machine, an outer race, and bearings positioned between the inner race and the outer race and configured to allow rotation of the inner race relative to the outer race; a bearing carrier connected to the outer race; a bracket connected to the bearing carrier and mounted to the frame, the bracket connection to the bearing carrier preventing the bearing carrier and the outer race from rotating with the inner race and the rotational output; and a sensor output line coupled to the control system of the power machine to provide output signals indicative of rotational speed and direction of the rotational output.

In some embodiments, the sensor apparatus further comprises a sleeve secured to the rotational output to secure the inner race to the rotational output. In some embodiments, the sleeve is secured to the rotational output using a set screw. The inner race is press fit onto the sleeve in some embodiments.

In some embodiments, the bearing carrier is connected to the outer race using a set screw extending through the bearing carrier to prevent the outer race from rotating relative to the bearing carrier. In other embodiments, the bearing carrier is connected to the outer race by a press-fit connection between the outer race and the bearing carrier to prevent the outer race from rotating relative to the bearing carrier. The bracket is connected to the bearing carrier using fasteners extending through the bearing carrier and the bracket in some embodiments.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used to describe illustrative embodiments and should not be regarded as limiting. Words such as "including," "comprising," and "having" and variations thereof as used herein are meant to encompass the items listed thereafter, equivalents thereof, as well as additional items.

Disclosed embodiments include power machines having an axle or other rotational output shaft of a drive system. In disclosed embodiments, a sensor assembly, such as an encoder bearing, is mounted to a frame of the power machine or an axle assembly and is operably connected to the output shaft of the axle to provide a precise and reliable sensing of the rotational speed and direction and the axle. The sensor assembly is operably connected to the axle or output shaft such that the sensor assembly resides external to the transaxle, as opposed to being built into the transaxle. As such, the sensor assembly can be included in newly manufactured vehicles, or can be added to previously manufactured vehicles without substantial modification of the previously manufactured vehicle (e.g., replacement and/or modification of a transaxle). Further, the sensor assembly configuration allows the use of the same sensor assembly to be common on multiple different power machines types and configurations.

Figure 2:
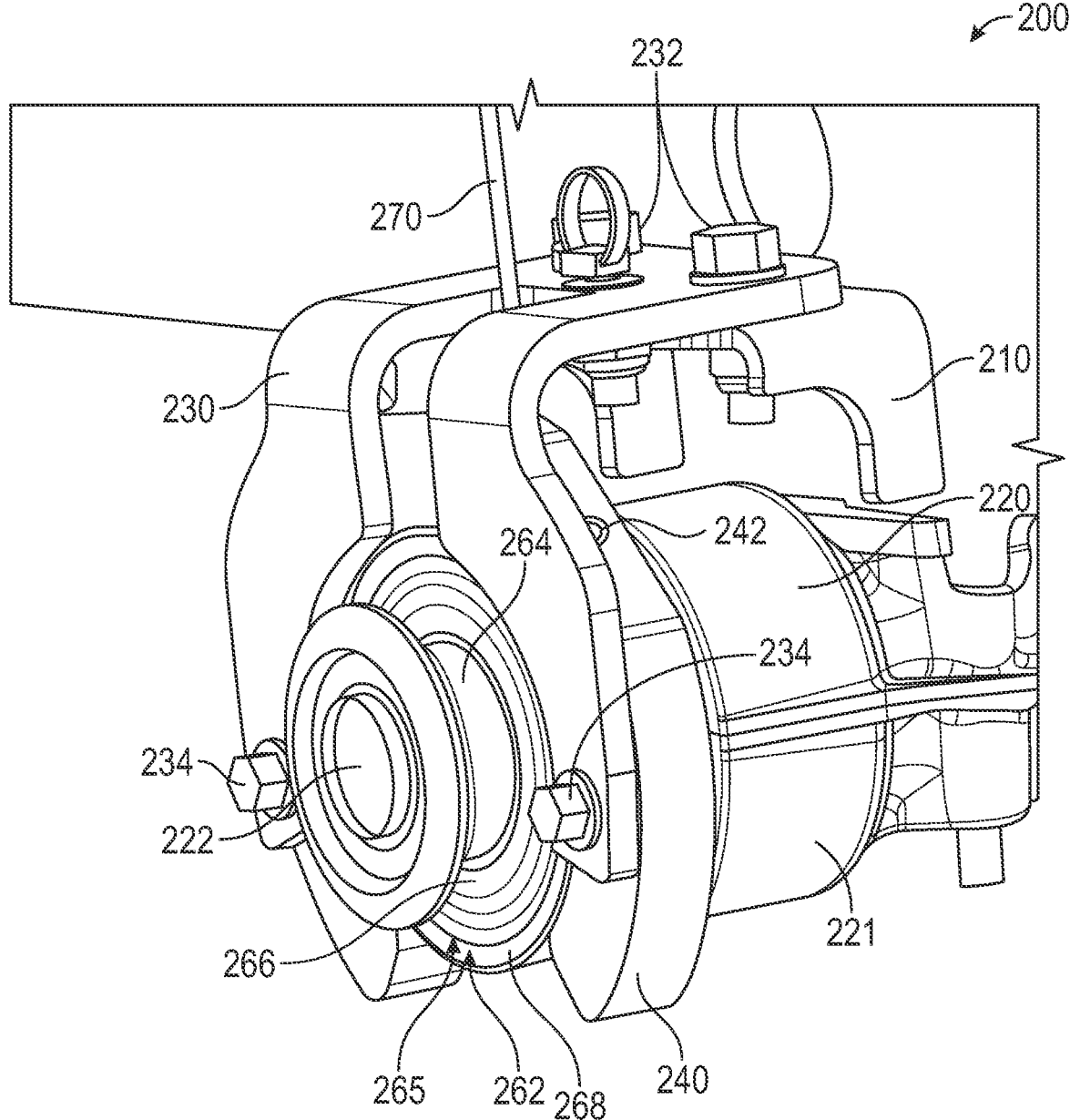
FIG. 2 illustrates a front perspective view of a first embodiment of a wheel speed sensor mount attached to a frame of a power machine and mounting a sensor to an axle of the power machine.
Figure 3:
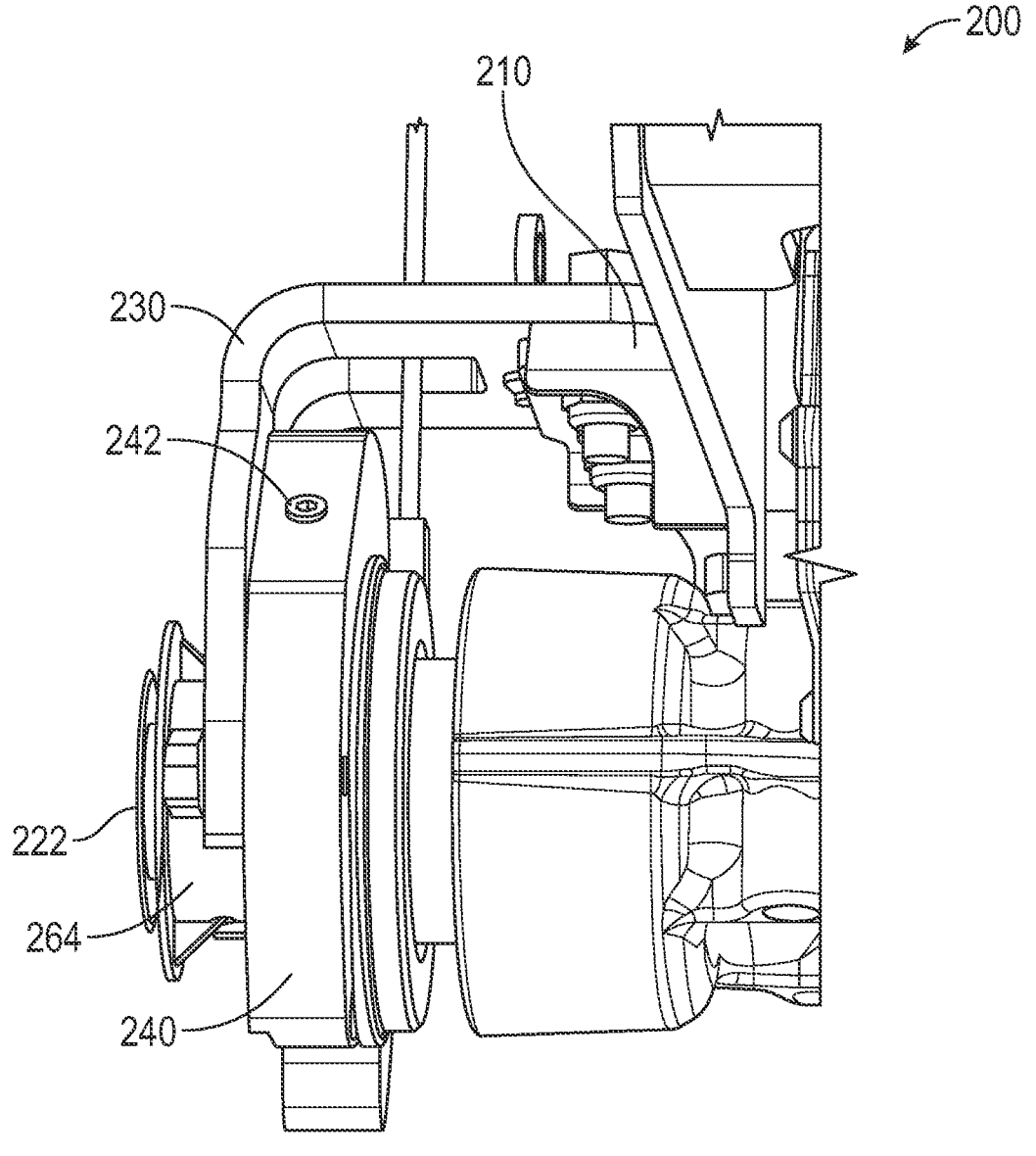
FIG. 3 is a side perspective view of the wheel speed sensor mount shown in FIG. 2.

These features, and the more general concepts, can be practiced on various power machines, as will be described below. A representative power machine on which the embodiments can be practiced is illustrated in diagram form in FIG. 1. Portions of a second power machine are shown in FIGS. 2-3. For the sake of brevity, only two power machines are discussed. However, as mentioned above, the embodiments below can be practiced on any of a number of power machines, including power machines of types different from the representative power machines shown in FIGS. 1-3. Power machines, for the purposes of this discussion, include a frame, at least one work element, and a power source that can provide power to the work element to accomplish a work task. One type of power machine is a self-propelled work vehicle, such as a zero-turn radius (ZTR) mower. Self-propelled work vehicles are a class of power machines that include a frame, work element, and a power source that can provide power to the work element. At least one of the work elements is a motive system for moving the power machine under power.

Figure 1:
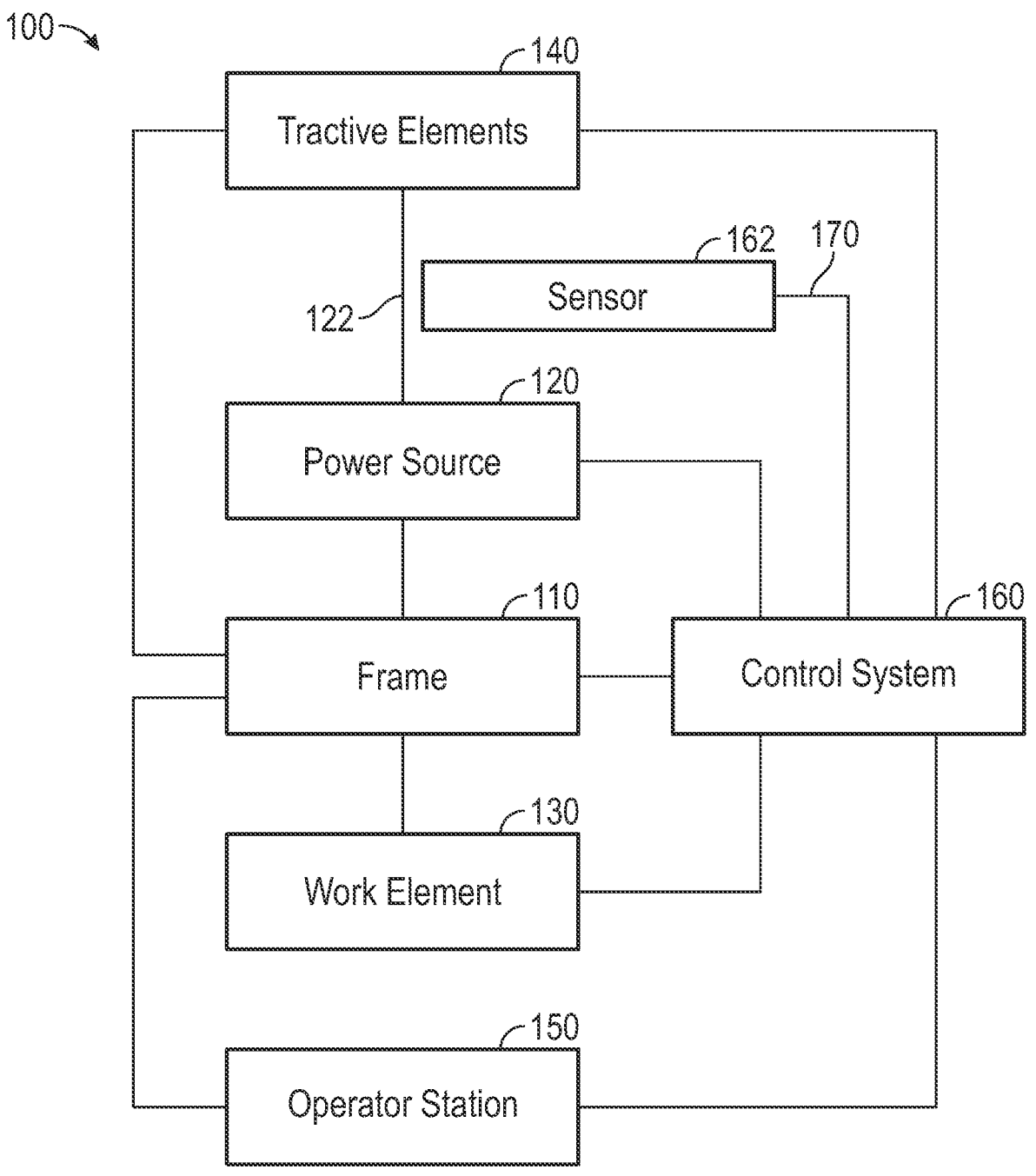
FIG. 1 is a block diagram illustrating functional systems of a representative power machine on which embodiments of the present disclosure can be advantageously practiced.

Referring now more specifically to FIG. 1, a block diagram illustrates basic systems of a power machine 100 upon which the embodiments discussed below can be advantageously incorporated. The power machine can be any of a number of different types of power machines, and in particular can be a mower such as a ZTR mower. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface, and an operator station 150 that provides an operating position for controlling the work elements of the power machine. A control system 160 is provided to interact with the other systems to perform various work tasks at least in part in response to control signals provided by an operator.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which can provide power to one or more work elements 130 including the one or more tractive elements 140. Power from the power source 120 can be provided directly to any of the work elements 130 or tractive elements 140. Alternatively, power from the power source 120 can be provided to a control system 160, which in turn selectively provides power to the elements that are capable of using it to perform a work function. Power sources for power machines typically include an engine such as an internal combustion engine and a power conversion system such as a mechanical transmission or a hydraulic system that can convert the output from an engine into a form of power that is usable by a work element. Other types of power sources can be incorporated into power machines, including electrical sources or a combination of power sources, known generally as hybrid power sources. In exemplary embodiments, the power source includes a transaxle or other devices which provide an axle or other rotational output 122 for driving tractive elements 140 such as wheels. The control system 160 includes a sensor 162 which senses the rotational position, speed and/or direction of the axle or output and provides output signals indicative of this data to control system 160 on output signal line 170.

FIG. 1 shows a single work element designated as work element 130, but various power machines can have any number of work elements. In ZTR mower embodiments of power machine 100, work element 130 includes a mower deck which houses at least one blade for cutting. In addition, tractive elements 140 are a special case of work element in that their work function is generally to move the power machine 100 over a support surface. Power machines can have any number of tractive elements, some, or all of which can receive power from the power source 120 to propel the power machine 100. Tractive elements can be, for example, track assemblies, wheels attached to an axle, and the like. In the disclosed ZTR mower embodiments, tractive elements 140 include a pair of individually driven rear wheels. Tractive elements can be mounted to the frame such that movement of the tractive element is limited to rotation about the corresponding axle 122 (so that steering is accomplished by a skidding action) or, alternatively, pivotally mounted to the frame to accomplish steering by pivoting the tractive element with respect to the frame.

Referring now to FIGS. 2-3, illustrated is a portion of a power machine 200 showing a frame 210 and transaxle assembly 220. The transaxle assembly 220 has a housing 221 with an axle 222 extending therefrom. The axle is operably coupled to and drives a wheel or other tractive element (not shown). While this example embodiment is described with reference to a transaxle assembly 220, axle 222 is intended to represent any rotational output of a power machine which is configured to drive tractive elements (i.e., other power conversion systems that do not include a transaxle may be employed without departing from the scope of the invention. Power machine 200 includes a sensor 262 which is configured to measure the rotational speed of axle 222 to provide an accurate and reliable wheel speed signal. In exemplary embodiments, sensor 262 is an encoder mounted in a bearing 265 that is, in turn, mounted on the frame 210 of the power machine. Sensor 262 is operably coupled to the axle 222, but not integrated into the transaxle 220 (i.e., is not located within a transaxle housing). In other embodiments, other types of sensors besides an encoder can be used. For example, resistive sensors, hall effect sensors or other similar types of sensor technology can be employed.

An example of an encoder sensor that can be utilized for sensor 262 is a motor encoder unit available from SKF of Gothenburg, Sweden. Such motor encoder units are accurate down to zero revolutions per minute, with the sensor body containing two Hall effect cells that produce an output signal with two square waves that are 90° out of phase with each other. The output signal can provide precise information on the direction of rotation and speed of rotation. Sensor 262 is, in some embodiments, housed in a housing that includes a bearing with an inner race 266 and an outer race 268. In some embodiments such as is shown in FIGS. 2-3, the bearing 265 is not used to bear any load, but by attaching the bearing to the axle, it provides a robust and reliable sensor platform for measuring wheel speed. Use of such an encoder type sensor to measure wheel speed in such applications has the advantage of providing consistent, reliable wheel speed data because the encoder sensor is advantageously impervious to vibration and relative motions of different components of the drive system in a way that some other sensor types are not.

In some embodiments, the inner race 266 can be pressed directly onto axle 222. However, in other embodiments such as that shown in FIGS. 2-3, the inner race 266 is positioned on a sleeve 264 that can be coupled to the axle for the purpose of positioning the sensor. In some exemplary embodiments, sleeve 264 can be press fit onto the axle or slid onto the axle and retained in place using one or more set screws (not shown) extending through the sleeve and into contact with the axle. The b inner race 266 rotates with axle 222 (and the sleeve 264 if there is such a sleeve). The outer race 268 of the bearing 265 is held stationary relative to the axle by a bearing carrier 240. The outer race 268 can be press fit into the bearing carrier 240, or in some embodiments is retained in place using one or more set screws 242 extending through the bearing carrier and into contact with the outer race. To support the sensor 262 in place and maintain the bearing carrier 240 and outer race 268 in the stationary position relative to the rotating axle 222, sleeve 264, and inner race 266 of the bearing, a bracket 230 is secured to the frame 210 of the power machine by bolts or other fasteners 232, and the bearing carrier is secured to the bracket by bolts or other fasteners 234. With sensor 262 installed on the axle of the power machine, an output signal line 270 provides the axle rotational direction, position and/or speed indicative signals to the control system as shown in FIG. 1 with reference to sensor 162 and control system 160.

Figure 4:
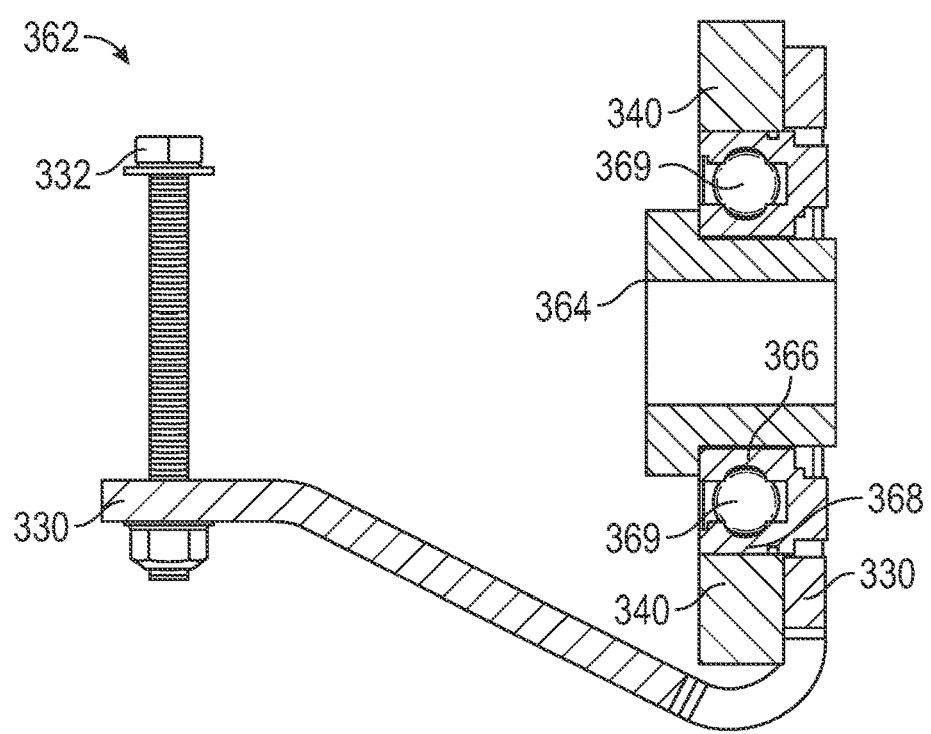
FIG. 4 is a side cross-sectional view of an embodiment of a wheel speed sensor and sensor mount.
Figure 5:
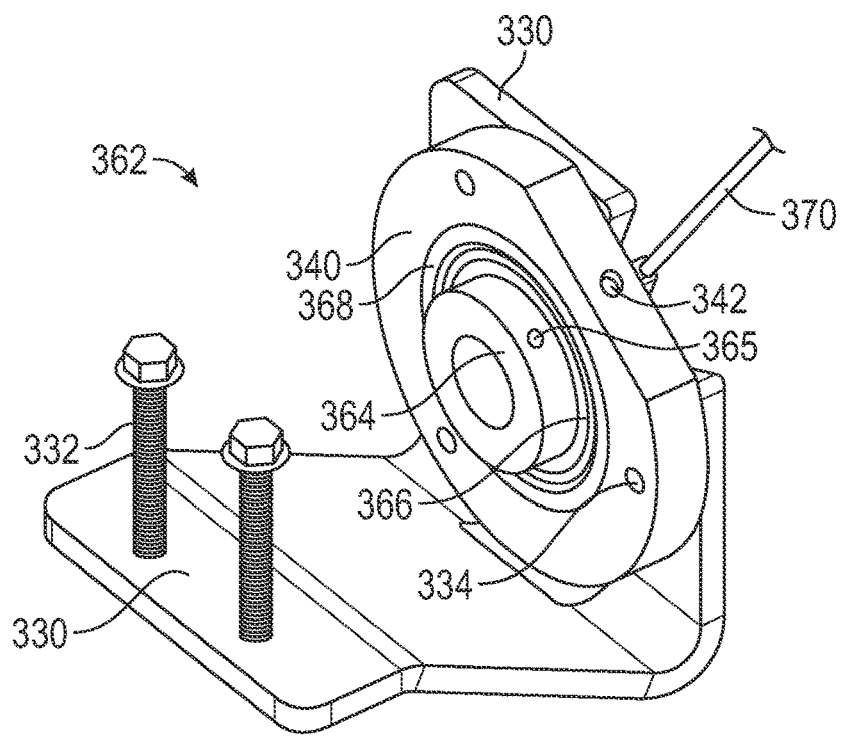
FIG. 5 is a perspective view of the wheel speed sensor and sensor mount shown in FIG. 4.

Referring now to FIGS. 4-5, illustrated is another embodiment of the sensor and mount configuration, shown not installed on an axle. FIG. 4 shows a cross-sectional view of the sensor and mount configuration, while FIG. 5 shows a perspective view of the same. Again, encoder bearing type sensor 362 is configured to measure the rotational speed of an axle. Sensor 362 can be press fit onto an axle, but in exemplary embodiments of the mount is press fit onto a sleeve 364 that can be affixed to the axle to position the sensor. A set screw 365 can be run through sleeve 364 to retain the sensor in place when not mounted on an axle. The bearing of sensor 362 has an inner race 366 that rotates with the sleeve 364 when installed on an axle. An outer race 368 of the bearing is held stationary relative to the axle by bearing carrier 340. As shown in the cross-sectional view of FIG. 4, bearings 369 are positioned between the inner and outer races, allowing the inner race to rotate relative to the outer race. The outer race 368 can be press fit into the bearing carrier 340 or, as is shown in the illustrated embodiment, can be retained in place using one or more set screws (not shown) in set screw receiving aperture 342 extending through the bearing carrier and allowing contact between the set screw and the outer race. Bearing carrier 340 is securable to bracket 330 using fasteners (not shown) and fastener receiving apertures 334 which extend through the bearing carrier and bracket. Bracket 330 is securable to the frame of the power machine or other supporting structure such as a transaxle using bolts or fasteners 332. An output signal line 370 of the sensor 362 is connectable to the control system of the power machine once installed on an axle of the machine. The output signal line 370 is, in exemplary embodiments, provided to a control system to provide an indication of the speed of the axle to which the sensor is operably coupled.

Although the present invention has been described with reference to preferred embodiments, workers skilled in the art will recognize that changes may be made in form and detail without departing from the scope of the discussion.

What is claimed is:

1. A mountable sensor apparatus configured to measure a rotational speed of an axle of a power machine, the mountable sensor apparatus comprising:
   an encoder bearing sensor comprising an inner race configured to be secured to the axle of the power machine, an outer race, and bearings positioned between the inner race and the outer race and configured to allow rotation of the inner race relative to the outer race;
   a bearing carrier connected to the outer race;
   a bracket connected to the bearing carrier and mountable to a support structure, the bracket connected to the bearing carrier configured to prevent the bearing carrier and the outer race from rotating with the inner race and the axle when the inner race is secured to the axle and the bracket is mounted to the support structure; and a sensor output line configured to be coupled to a control system of the power machine to provide output signals indicative of rotational speed and direction of the axle.

2. The mountable sensor apparatus of claim 1, and further comprising a sleeve configured to be secured to the axle of the power machine to secure the inner race to the axle.

3. The mountable sensor apparatus of claim 2, wherein the sleeve is configured to be secured to the axle using a set screw.

4. The mountable sensor apparatus of claim 2, wherein the inner race is press fit onto the sleeve.

5. The mountable sensor apparatus of claim 1, wherein the bearing carrier is connected to the outer race using a set screw extending through the bearing carrier to prevent the outer race from rotating relative to the bearing carrier.

6. The mountable sensor apparatus of claim 1, wherein the bearing carrier is connected to the outer race by a press-fit connection between the outer race and the bearing carrier to prevent the outer race from rotating relative to the bearing carrier.

7. The mountable sensor apparatus of claim 1, wherein the bracket is connected to the bearing carrier using fasteners extending through the bearing carrier and the bracket.

8. The mountable sensor apparatus of claim 1, wherein the support structure that the bracket is configured to be mounted to is a frame of the power machine.

9. A power machine comprising:

a frame;

a power source supported by the frame and providing a rotational output for driving a tractive element of the power machine;

a control system configured to control the power source;

a sensor apparatus mounted to the frame and secured to the rotational output, the sensor apparatus configured to measure a rotational speed of the rotational output, the sensor apparatus comprising:

an encoder bearing sensor comprising an inner race secured to the rotational output of the power machine, an outer race, and bearings positioned between the inner race and the outer race and configured to allow rotation of the inner race relative to the outer race;

a bearing carrier connected to the outer race;

a bracket connected to the bearing carrier and mounted to the frame, the bracket connected to the bearing carrier preventing the bearing carrier and the outer race from rotating with the inner race and the rotational output; and a sensor output line coupled to the control system of the power machine to provide output signals indicative of rotational speed and direction of the rotational output.

10. The power machine of claim 9, wherein the sensor apparatus further comprises a sleeve secured to the rotational output to secure the inner race to the rotational output.

11. The power machine of claim 10, wherein the sleeve is secured to the rotational output using a set screw.

12. The power machine of claim 10, wherein the inner race is press fit onto the sleeve.

13. The power machine of claim 10, wherein the bearing carrier is connected to the outer race using a set screw extending through the bearing carrier to prevent the outer race from rotating relative to the bearing carrier.

14. The power machine of claim 10, wherein the bearing carrier is connected to the outer race by a press-fit connection between the outer race and the bearing carrier to prevent the outer race from rotating relative to the bearing carrier.

15. The power machine of claim 10, wherein the bracket is connected to the bearing carrier using fasteners extending through the bearing carrier and the bracket.

* * * * *